United States Patent
Nonaka et al.

Patent Number: 6,067,110
Date of Patent: *May 23, 2000

[54] OBJECT RECOGNIZING DEVICE

[75] Inventors: Kenichi Nonaka; Yoshimitsu Saitou; Masaaki Abe; Seiichi Yokoyama, all of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/675,163

[22] Filed: Jul. 3, 1996

[30] Foreign Application Priority Data

Jul. 10, 1995 [JP] Japan .................................... 7-206394
Jul. 19, 1995 [JP] Japan .................................... 7-213894

[51] Int. Cl.[7] .............................. H04N 7/18; H04N 5/30; G08G 1/00
[52] U.S. Cl. ........................... 348/148; 348/162; 348/164
[58] Field of Search ..................... 348/164, 162, 348/118–123, 31, 33, 67, 148, 149; 340/903, 435, 436, 937, 932.2, 904, 32, 33, 34; 250/208.1, 559.44, 559.07, 559.08; 256/4; H04N 7/18, 5/30; G08G 1/00

[56] References Cited

U.S. PATENT DOCUMENTS

| | | | |
|---|---|---|---|
| 3,243,806 | 3/1966 | Max | 340/436 |
| 3,949,362 | 4/1976 | Doyle et al. | 340/34 |
| 4,143,400 | 3/1979 | Heckmean, Jr. et al. | 358/95 |
| 4,383,238 | 5/1983 | Endo | 340/904 |
| 4,447,800 | 5/1984 | Kasuyama et al. | 340/904 |
| 4,552,456 | 11/1985 | Endo | 340/904 |
| 4,632,543 | 12/1986 | Endo | 340/904 |
| 4,786,164 | 11/1988 | Kawata | 356/4 |
| 4,967,270 | 10/1990 | Ulich et al. | 358/95 |
| 5,040,116 | 8/1991 | Evans | 356/4 |
| 5,214,408 | 5/1993 | Asayama | 340/435 |
| 5,293,162 | 3/1994 | Bachalo | 340/905 |
| 5,304,980 | 4/1994 | Maekawa | 340/435 |
| 5,515,042 | 5/1996 | Nelson | 340/937 |
| 5,529,138 | 6/1996 | Shaw et al. | 180/169 |
| 5,646,614 | 7/1997 | Aberfelder et al. | 340/932.2 |

FOREIGN PATENT DOCUMENTS

54-92117 of 1979 Japan .
6215300 of 1994 Japan .

*Primary Examiner*—Bryan Tung
*Assistant Examiner*—Tung Vo
*Attorney, Agent, or Firm*—Lyon & Lyon LLP

[57] ABSTRACT

An object recognizing device for recognizing an object by transmitting laser light from a laser light source and receiving reflected light from the object by a light sensor, wherein the laser light source and the light sensor are disposed at a relative vertical distance of not less than 20 cm therebetween with a divergence angle $\theta_1$ of the laser radiation emitted from the laser light source being set at a value of not more than 5 mrad and being smaller than an angle $\alpha$ formed between an optical axis of the laser light and an optical axis of the reflected light entering into the light sensor, and which is, therefore, capable of effectively recognizing any object even in an atmosphere containing aerosol, e.g., fog or haze.

17 Claims, 6 Drawing Sheets

OBJECT RECOGNIZING DEVICE

BACKGROUND OF THE INVENTION

The present invention relates to an object recognizing device which is capable of recognizing an object by transmitting light from a light source and receiving reflected light from the object.

FIGS. 4 and 5 show a conventional laser radar (pulse radar) unit 4 comprising a semiconductor laser (light source) and a light sensor (photodiode), which is attached to a vehicle 5 for recognizing an object on the road ahead of the vehicles In FIGS. 4 and 5, numeral 41 designates a lens disposed at a radiation outlet of the laser light source and numeral 42 designates a lens disposed at a reflected light receiving port of the light sensor. The laser radar of this type can recognize a distant object at a distance of not less than 100 m therefrom if the monitored space does not contain aerosol such as fog, smoke and dust. But, its ability may be extremely reduced if there is aerosol that scatters light radiation emitted to the object and reflected light therefrom.

Japanese laid-open patent No. 6-215300 discloses another conventional object-recognizing device that recognizes an object in an area ahead of the vehicle through video taking by a video camera mounted on the vehicle.

This device, however, is not usable in poor visibility conditions, e.g., in fog, because the video camera cannot monitor the forward area even when illuminated by the headlights of the vehicle.

In case that, as shown in FIG. 12, the headlights 10 of a vehicle 13 on a road 14 illuminate a forward area with light LL at a relatively large divergence angle 8 and a video camera 8 takes a reflected light (RL) image of the illuminated area, but aerosol Z (fog, smoke or dust) contained in the air space of the illuminated area may scatter the light LL and then the light N of the scattered light enters as a noise signal into the video camera 8. A part of light LL passing a layer of aerosol Z illuminates an object 9 in the illuminated area and reflected light RL therefrom is further scattered by aerosol Z and attenuates. As a result, a very small part of reflected light RL reaches the video camera.

The more aerosol particles Z that are contained in the illuminated space, the more the noise increases and the less the reflected light RL reaches therefrom. Consequently, the video camera 8 cannot take an image of the forward area through the aerosol layer even when the area is illuminated with light LL of an increased intensity.

Japanese laid-open patent No. 54-92117 also discloses such a device that recognizes an object in a forward area by taking an image thereof with an infrared camera attached to a vehicle.

Although the infrared camera can well recognize such an object that emits a large amount of infrared radiation (e.g., a human body, car and so on) even at night or in fog, it may not clearly indicate a road surface, road construction or other object that emits a small amount of infrared radiation. For example, the infrared camera cannot detect a white line marked on a road surface.

The problems to be solved are as follows:

The conventional laser radar cannot recognize an object in a monitored area if there is an excess of aerosol such as fog, smoke and dust particles that may scatter laser light.

The conventional object-recognizing device using a video camera cannot take a forward area image in a foggy, smoky or dusty atmosphere.

The conventional object-recognizing device using an infrared-camera cannot recognize an object that emits a small amount of infrared radiation.

SUMMARY OF THE INVENTION

Accordingly, the present invention is intended to provide an object-recognizing device for recognizing an object by transmitting laser light (or illuminating light) from a laser light source (or illumination light source) and receiving reflected light from the object by a light sensor, which device is capable of recognizing any object in a monitored space area even if said space contains aerosol such as fog, smoke and dust, owing to the fact that the arrangement of the laser light source (or illumination light source) and the light sensor is devised and a divergence angle of laser light (or illumination light) from the laser light source (or the illumination light source) is specified so as to minimize the noise signals derived from light scattered by the aerosol and assure enough amount of light reflected from the object with a high signal-to-noise ratio.

For this purpose, the present invention provides an object recognizing device wherein the laser light source and the light sensor are disposed at a relative vertical distance of not less than 20 cm therebetween.

The present invention provides an object recognizing device wherein a divergence angle of the laser light emitted from the laser light source is not more than 5 mrad.

The present invention also provides an object recognizing device, which is provided with a first camera for taking an image of an area illuminated by the illumination light source, a second camera for taking an image in the same direction as the first camera but in a different sensitive range of wavelength, and an image synthesizing means for synthesizing the two images taken by the first camera and the second camera respectively to make it possible to obtain a good and complete image of a monitored area in an atmosphere containing aerosol particles such as fog, smoke and dust.

The above-mentioned object-recognizing device is characterized in that the first camera is sensitive to a wavelength band of visible light or near infrared radiation and the illumination light source and the first camera are disposed at such relative positions where a divergence angle of illuminating light emitted from the illumination light source and a single-pixel viewing angle of the first camera may be smaller than an angle formed between an optical axis of the illuminating light and an optical axis of the reflected light from the illuminated area and therefore the first camera may take a reflected light image of an illuminated area with a high signal-to-noise ratio in atmosphere containing aerosol particles such as fog, smoke and dust.

The second camera is sensitive to a wavelengths of infrared radiation and can recognize a human body and an automobile in a relatively wide area in an atmosphere containing aerosol particles such as fog, smoke and dust.

DESCRIPTION OF THE PREFERRED EMBODIMENT

The preferred embodiments of the present invention will now be described in detail with reference to the accompanying drawings.

Figure 1:
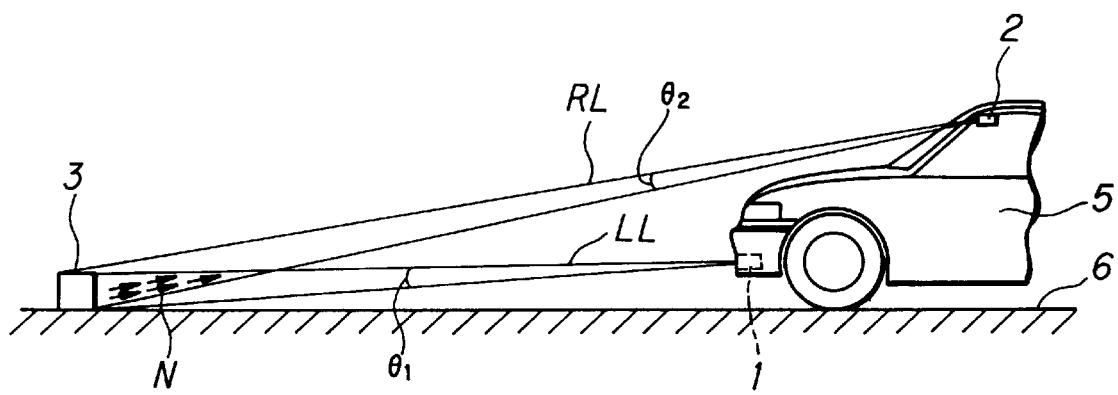
FIG. 1 is a side elevation view showing such a state in which an object is detected by a laser radar embodying the present invention mounted on a vehicle.
Figure 2:
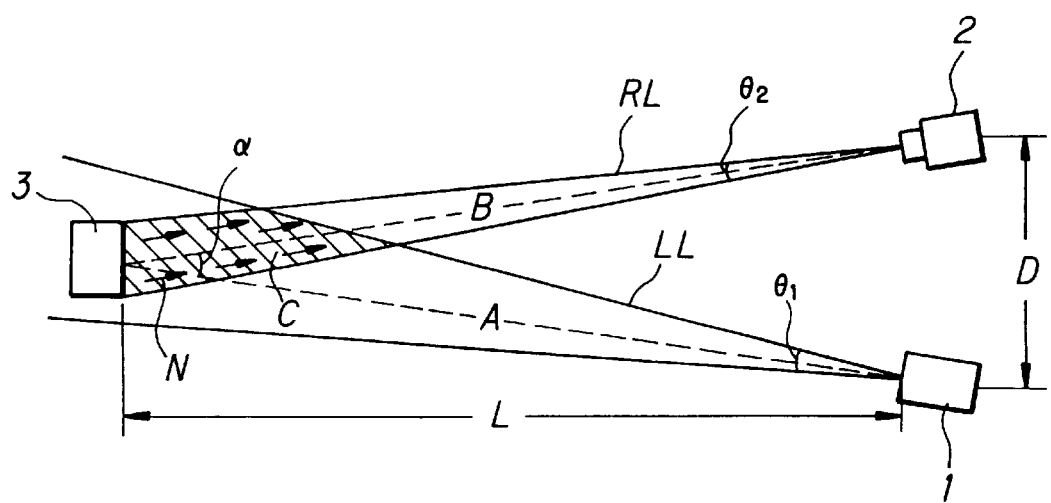
FIG. 2 is a schematic illustration of a simulation model for determining a signal-to-noise ratio of reflected light from an object detected by a laser radar.

FIG. 2 is illustrative of a simulation model for determining signal-to-noise ratios of reflected light RL from an object 3 when varying the divergence angle $\theta_1$ of the laser light LL emitted from a laser light source 1. The simulation model is such that a light sensor 2 receives reflected light RL from an object 3 having the reflectance of "1" (meaning a complete reflectance) and being disposed forward at a distance of L=50 m in a fog that may cause the laser radiation to have a decreased transmittance of about 5% after having passed through a distance of 50 m.

Figure 3:
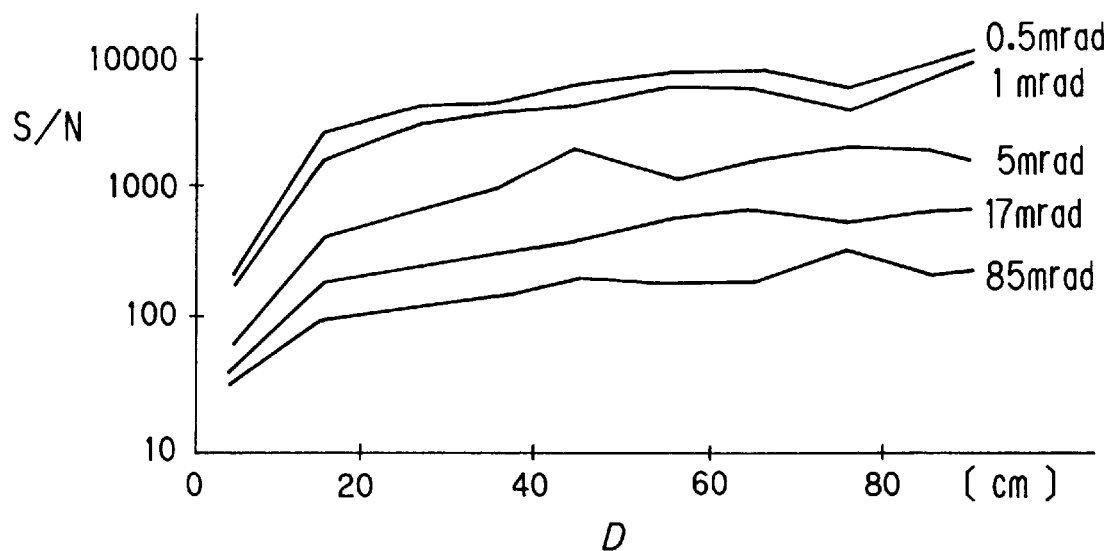
FIG. 3 is a graph of characteristic curves of simulation results, which are plotted for laser-light divergence angle as a parameter, taking a distance from a laser light source to a light sensor as the abscissa and taking signal-noise ratio of reflected light as the ordinate.
Figure 4:
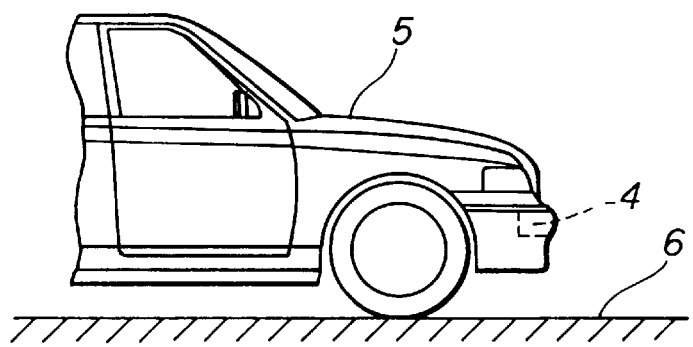
FIG. 4 is a side view of a conventional laser radar mounted on a vehicle.
Figure 5:
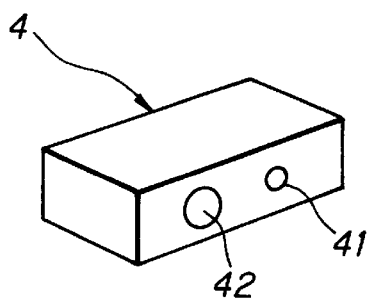
FIG. 5 is a perspective view showing the appearance of a conventional laser radar unit.

FIG. 3 shows characteristic curves of the simulation results, with a distance D from a laser light source to a light sensor as the abscissa and the signal-to-noise ratio of a reflected light as the ordinate. The curves are plotted for a divergence angle $\theta_1$ of laser light LL at intervals of 0.5 mrad, 1 mrad, 5 mrad, 17 mrad, 85 mrad (about 5°) as a parameter.

The simulation results show that the signal-to-noise ratio of reflected light is improved, i.e. becomes larger, as the distance D between the laser light source 1 and the light sensor 2 increases and the divergence angle $\theta_1$ of the laser light LL decreases.

This is explained by the fact that an overlap area C of an area A of the laser radiation LL with an area B of the reflected light RL is reduced in size by increasing the distance D from the laser light source 1 to the light sensor 2 and by decreasing the divergence angle $\theta_1$ of the laser light LL and, thereby, the amount of noise light N derived from laser light LL scattered by the aerosol and directed toward the light sensor 2 is reduced.

In view of the above-mentioned simulation results, showing in FIG. 3 that the signal-to-noise ratio becomes substantially constant at about D=20 cm and larger, it is preferred by the present invention that the laser light source 1 and the light sensor 2 be disposed and spaced at a relative distance of not less than 20 cm in a vertical plane to obtain a satisfactory signal-to-noise ratio of the reflected light that is enough to detect the object 3 in the medium containing aerosol particles such as fog, smoke and dust.

It is preferred in the present invention that the divergence angle $\theta_1$ of the laser light LL emitted from the laser light source 1 is not more than 5 mrad.

Further, it is preferred in the present invention that the laser light source 1 and the light sensor 2 be disposed at relative positions where the divergence angle angle $\theta_1$ of the laser light LL emitted from the laser light source 1 is smaller than an angle formed between the optical axis of the laser light and the optical axis of the reflected light entering into the light sensor (i.e., $\theta_1 < \alpha$).

Also, it is preferred in the present invention that the reflected-light RL receiving angle $\theta_2$ (see FIG. 2) of the light sensor also has the relation $\theta_2 < \alpha$ and is set as small as possible so that no disturbance occurs in sensing the object 3.

In the case of attaching a laser radar according to the present invention to a vehicle in order to detect an obstruction in an area ahead of the vehicle, a laser light source 1 made of a semiconductor laser is attached to a bumper of the lower portion of the vehicle 5 and a light sensor 2 having a photo-diode is attached to an upper portion of a front window glass of the vehicle 5 so as to obtain the maximum possible distance from the light source 1 to the light sensor 2 in a vertical plane.

On the basis of the simulation results, it is preferred that the laser light source 1 and the light sensor 2 be disposed at a vertical distance D of 80 cm therebetween to emit illuminating light LL at a divergence angle $\theta_1$ of 1 mrad and to receive reflected light from an object existing 50 meters ahead of the vehicle through a foggy medium that allows 5% of light radiation LL to pass through a distance of 50 m. In this instance, the laser radar of the present invention may receive reflected light with an increased signal-to-noise ratio improved by 2 to 3 orders as compared with a conventional laser radar that operates under the same conditions but is set to emit a laser light LL at a divergence angle $\theta_1$ of 5° or more.

Consequently, the conventional laser radar 4 cannot observe the object if the monitored space contains a large amount of aerosol (fog, smoke and dust) that increases the scattered light (noise) in the amount of reflected light. In the same circumstances, the laser radar of the present invention can recognize the object because its light sensor can receive the reflected light having a high signal-to-noise ratio by virtue of effectively suppressing the scattered light noise.

In mounting the laser light source 1 and the light sensor 2 on the vehicle 5 that may have a limited distance D between them, the size of an overlap C of an area A of laser radiation (LL) with an area B of reflected light (RL) can be effectively reduced by keeping the relation $\theta_1 < \alpha$.

To assure a wide monitoring view ahead of the vehicle 5, it is possible to provide a plurality of laser radars in the crosswise direction on the vehicle or to provide a plurality of light sensors with a scanning mirror for scanning the laser light LL from the laser light source 1 in the transverse direction.

The improved laser radar system according to the present invention can be easily realized on the basis of a conventional laser radar by only changing the distance between the laser light source and the light sensor, rather than having a single unit 4 with a lens disposed at a laser light emitting port of the laser light source and a lens disposed at reflected-light receiving port of the light sensor.

The above-described embodiment may also use an ordinary illumination lamp instead of the laser light source 1 and can also recognize an object in an atmosphere containing aerosol such as fog, smoke and dust by receiving reflected light having a high signal-to-noise ratio from the object owing to minimized induction of noise derived from light scattered by the aerosol particles.

In the case of an ordinary illumination lamp as a light source, an observer also can directly recognize an object in an aerosol-containing atmosphere if the reflected light directly reaches his eyes instead of or in addition to the light sensor 2.

Figure 10:
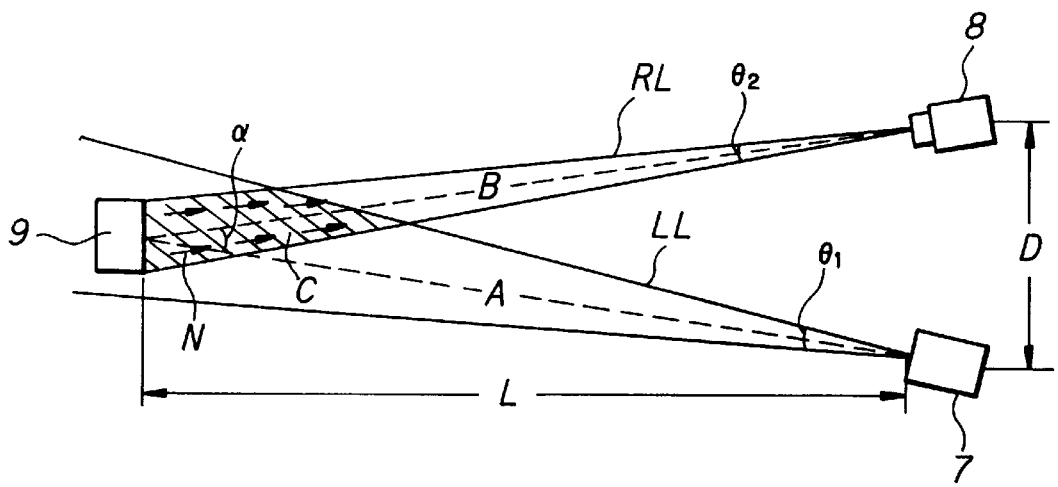
FIG. 10 is a schematic illustration of a simulation model for determining a signal-to-noise ratio of reflected light when taken through a video camera of a picture of an area illuminated by an illuminating lamp.

FIG. 10 is illustrative of a simulation model for determining signal-to-noise ratios of reflected light by varying the divergence angle $\theta_1$ of illuminating light LL at a variable distance D between an illumination light source 7 and a video camera 8 under the conditions that illuminating light is emitted toward an object 9 arranged at L=50 m ahead in a foggy medium allowing about 5% of the light to pass through a distance of 50 m and the reflected light RL from the object 9 having a reflectance of "1" is received by a video camera 8.

The characteristic curves of the simulation results using an illuminating light source, are substantially similar to those shown in FIG. 3.

The simulation results show that the signal-to-noise ratio of the reflected light is improved with a decrease of the divergence angle $\theta_1$ of light LL emitted from the illumination light source 7. The same effect is obtained by reducing the divergence angle (field-of-vision angle) $\theta_2$ of received light RL of one pixel at a video camera 8. It is also clear that the signal-to-noise ratio of the reflected light can be improved by increasing the distance D between the illuminating light source 7 and the video camera 8.

This may be explained by the fact that reducing the divergence angle $\theta_1$ of the illumination light LL or field-of-vision angle $\theta_2$ of the video camera 8 and increasing the distance D from the illumination light source 7 to the video camera 8 may decrease the size of the overlap area C of an area A of the illumination light LL with an area B of the reflected light RL, limiting the amount of noise light which is scattered in fog and partly transmitted toward the video camera.

Illuminating light LL emitted from the illumination light source 7 may be infrared light that can effectively penetrate aerosol (e.g., smoke, fog and dust). However, visible light or near infrared light is more suitable to use for the following reason:

With the illumination light source 7 and the video camera 8, which are attached to a vehicle to illuminate a forward road area and take an image thereof, it is preferred to use illuminating light whose wavelength is smaller than surface irregularities of an object so as to obtain enough amount of reflected light therefrom even when the light strikes the object at an angle. Consequently, it is preferable to use visible light or near-infrared light whose wavelength is shorter than that of infrared light.

Figure 11:
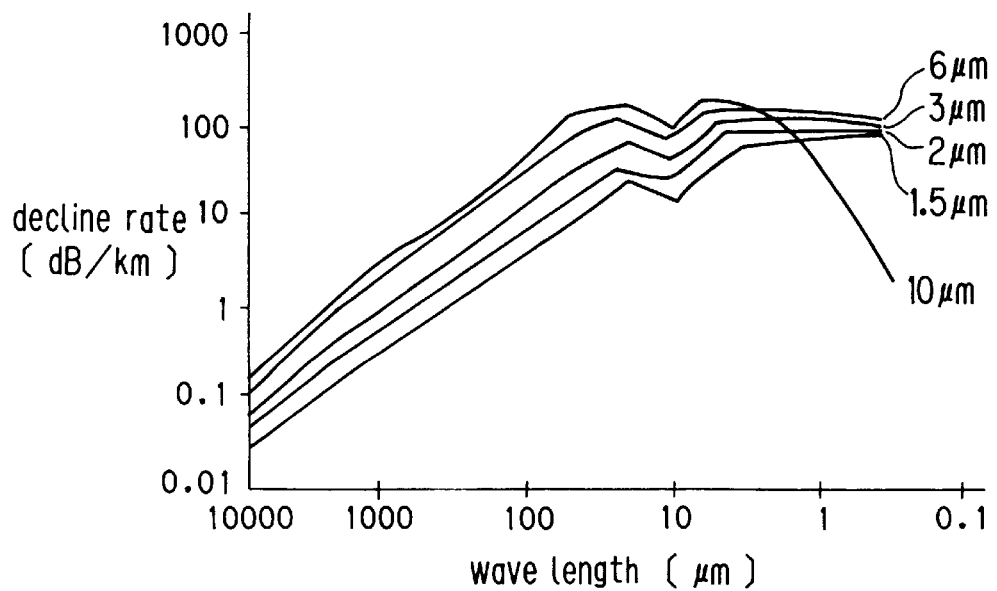
FIG. 11 is a graph of characteristic curves of transmittance of electromagnetic waves in an artificial fog, which values were obtained by measuring the transmittance under the same conditions but varying the sizes of fog particles from 1 to 10 μm.
Figure 12:
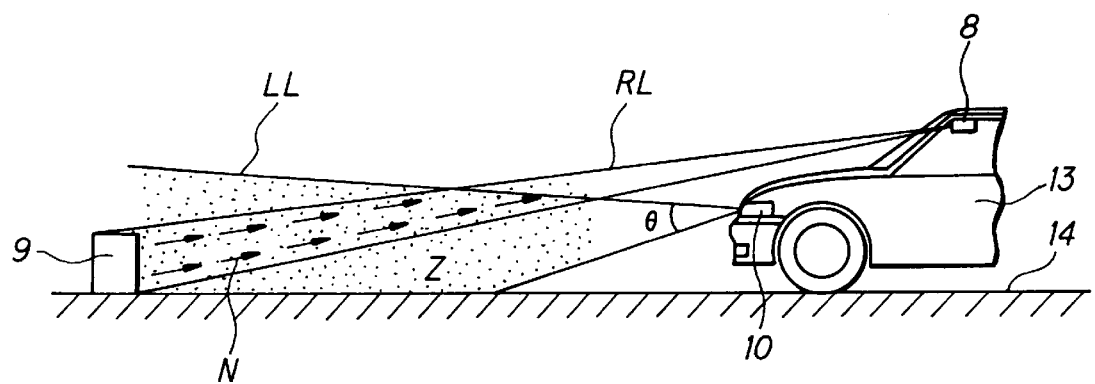
FIG. 12 is a schematic illustration showing a state in which an area illuminated by conventional headlights of a vehicle is pictured by a video camera.

FIG. 11 shows characteristic curves of transmittance of electromagnetic waves in an artificial fog, which were obtained under the same conditions except for varying the aerosol particle sizes from 1.5 to 10 $\mu$m. The measured value "declining rate (dB/Km)" illustrated in FIG. 11 represents a ratio of the attenuation of the electromagnetic wave per one kilometer (Km). The measurement results indicate that infrared radiation possessing wavelengths of about 10 microns (in the range of 5 to 20 $\mu$m) has a high power of penetrating fog.

The object matter itself emits electromagnetic radiation, most of which is infrared radiation of about 10 $\mu$m in wavelength at a normal temperature.

Accordingly, an image of the object in aerosol (fog, smoke and dust) can be obtained by using an infrared camera possessing sensitivity to radiation of wavelengths of about 10 $\mu$m. In road circumstances, a human body and a car can be detected effectively since they have a higher temperature than the surroundings and emit a large amount of infrared radiation.

Figure 6:
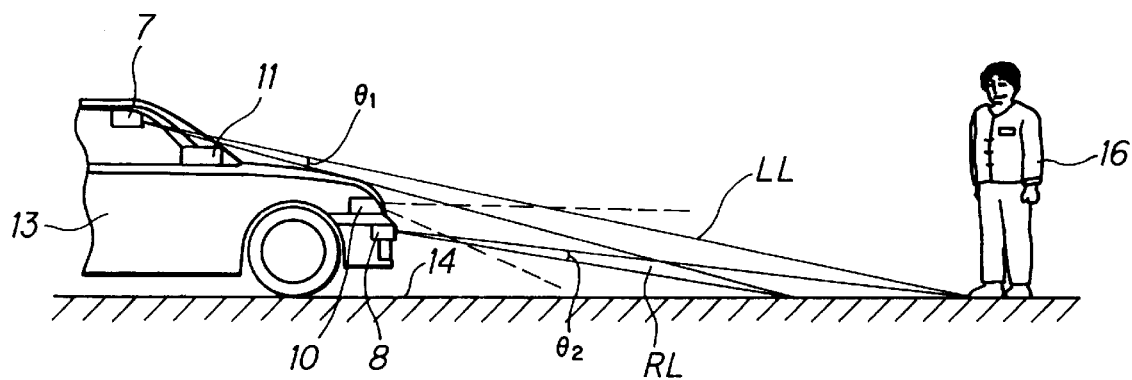
FIG. 6 is a schematic illustration of an object recognizing device that is another embodiment of the present invention.

FIG. 6 shows an object recognizing device embodying the present invention, which is constructed in view of the foregoing examination results. This embodiment is mounted on a vehicle and is capable of illuminating an area of a road ahead of the vehicle with light from a light source 7, monitoring the illuminated area in an atmosphere containing aerosol (e.g., fog, smoke or dust particles) by using mainly a video camera 8 and widely searching every obstruction (e.g., a human body or other vehicle) existing ahead on the road by using an infrared camera 11. Two kinds of images taken respectively by the video camera and the infrared camera are then synthesized by using an image synthesizer (not shown).

The illumination light source 7 and the video camera 8 are disposed on the front portion of a vehicle 13 in such a relation that a divergence angle $\theta_1$ of illuminating light LL of the illumination light source 7 and a single-pixel field-of-vision angle $\theta_2$ of the video camera 8 are respectively smaller than an angle $\alpha$ formed between an optical axis of the light LL illuminating a forward extending road 14 and an optical axis of the reflected light RL from the road surface 14 (i.e. the relation $\theta_1$, $\theta_2 < \alpha$ may be realized).

With the arrangement of the illumination light source 7 and the video camera 8 to satisfy the relation $\theta_1$, $\theta_2 < \alpha$ on the front portion of the vehicle 13, the video camera 8 can effectively obtain an image of the illuminated area even though aerosol exists in the air because it may receive reflected light of a high S/N ratio with a maximally limited amount of noise light that is scattered by the aerosol and directed toward a light-receiving port of the video camera 8.

In this instance, the illumination light source 7 and the video camera 8 are set to illuminate and monitor the surface 14 of the road by several meters ahead of the vehicle 13 to obtain a field of view necessary for travelling in fog. Furthermore, the illumination light source 7 has an aperture allowing the emitted light LL to spread in the transverse direction of the road and the light-receiving port of the video camera 8 has an aperture widened in the transverse direction so as to widely monitor the road area 14.

Figure 7:
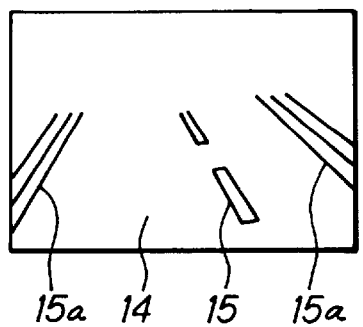
FIG. 7 shows an example of a picture of an area searched by the embodiment of FIG. 6 and illuminated by illuminating lamp, which picture is taken by a video camera.

FIG. 7 is illustrative of an image of a road surface 14, which is taken by using the video camera 8 and the illumination light source 7 mounted on the front portion of the vehicle 13. The picture clearly represents a white center line 15 and white side lines 15a drawn on the road surface 14.

At the same time, the video camera can also take a picture of the near-front area of the road surface 14 that is illuminated by the headlights 10 of the vehicle.

An area that cannot be illuminated with light from the illumination light source 7 and the headlights 10 of the vehicle is predicted from all the image data. The data amount can be increased by scanning a plurality of lines of the illumination light source 7.

The infrared camera 11 is disposed at the front portion of the vehicle 13 to take a wide image of the area ahead thereof.

Figure 8:
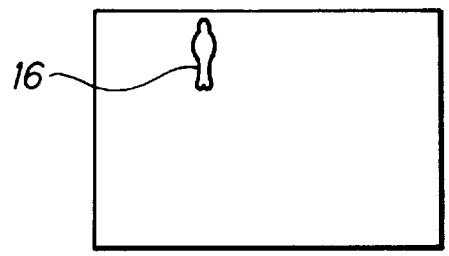
FIG. 8 shows an example of a picture taken by an infrared camera of the embodiment of FIG. 6.

FIG. 8 shows an example of a picture taken by an infrared camera 11, which clearly represents a human FIG. 16 existing outside the area illuminated with light from the front illumination light source 7.

Figure 9:
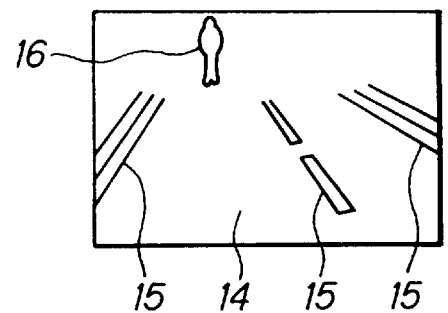
FIG. 9 shows an example of a picture synthesized from a picture taken by a video camera and a picture taken by an infrared camera.

Two different kinds of images are taken by the video camera 8 and the infrared camera 5 respectively while the vehicle travels in fog and are combined by an image synthesizer (not shown) to generate a practically integrated image that shows the forward extending road surface 14 illuminated with light from the illumination light source 7 and a human FIG. 16 standing outside the illuminated area as shown in FIG. 9.

The synthesized image may be projected toward the front glass in front of the driver seat. This enables the driver to visually recognize the state of the road ahead of the vehicle and detect any obstruction (e.g., a human or other vehicle) existing thereon even when he drives the vehicle in a dense fog.

The synthesized image data may be also transmitted to an automatic travelling device for the vehicle to automatically steer the vehicle avoiding every detectable obstruction on the road.

Furthermore, the object recognizing devices according to the present invention are not only used for vehicles, but can also be applied widely as visual devices of self-travelling robots and ordinary monitoring systems.

As described above, the present invention provides an object recognizing device for recognizing an object by transmitting laser radiation from a laser light source and receiving reflected light from the object by a light sensor, wherein the laser light source and the light sensor are disposed at a relative vertical distance of not less than 20 cm therebetween and a divergence angle of the laser light emitted from the laser light source is not more than 5 mrad, and which is, therefore, capable of recognizing any object by receiving reflected light therefrom at a high S/N ratio even in an atmosphere containing aerosol (e.g., fog, smoke and dust) that scatters light and does not permit effective monitoring by the conventional devices.

The present invention provides an object recognizing device for recognizing an object by transmitting laser light from a laser light source and receiving reflected light from the object by a light sensor, wherein the laser light source and the light sensor are disposed in such a relation that a divergence angle of the laser light emitted from the laser light source may be smaller than an angle formed between an optical axis of the laser light and an optical axis of the reflected light entering into the light sensor and which is therefore capable of recognizing any object in aerosol.

The present invention provides an object recognizing device which has an illuminating light source specially devised for obtaining reflecting light of a high S/N-ratio, a first camera for taking an image of an area illuminated by the illumination light source and a second camera for taking an image in the same direction as the first camera but in a different sensitive band of wavelengths, and wherein the two kinds of images taken the first camera and the second camera are synthesized to generate a practically usable image even when driving a vehicle in an aerosol atmosphere of poor visibility.

What is claimed is:

1. An object recognizing device for recognizing an object by transmitting laser light from a laser light source and receiving reflected light from the object by a light sensor, wherein the laser light source and the light sensor are so relatively arranged that a divergence angle $\theta_1$ of the laser light emitted from the laser light source is not more than 5 mrad and smaller than an angle $\alpha$ formed between an optical axis of the laser light and an optical axis of the reflected light entering into the light sensor.

2. An object recognizing device for recognizing an object by transmitting illuminating light from an illumination light source and receiving reflected light from the object by a light sensor, wherein the illuminating light source and the light sensor are so relatively arranged that a divergence angle $\theta_1$ of not more than 5 mrad illuminating light emitted from the illumination light source and a divergence angle $\theta_2$ of reflected light entering into the light sensor are smaller than an angle $\alpha$ formed between an optical axis of the illuminating light and an optical axis of the reflected light.

3. An object recognizing device for recognizing an object by transmitting illuminating light from an illumination light source and receiving reflected light from the object by a light sensor, wherein the illumination light source and the light sensor are so relatively arranged that a divergence angle $\theta_1$ of not more than 5 mrad illuminating light emitted from the illuminating light source is smaller than an angle $\alpha$ formed between an optical axis of the illuminating light and an optical axis of the reflected light.

4. An object recognizing device for recognizing an object from a picked-up image of an area illuminated by an illuminating light source, including a first camera for taking an image of an area illuminated by the illumination light source, a second camera for taking an image in the same direction as the first camera but in a different sensitive range of wavelengths, and an image synthesizing means for synthesizing the two images taken by the first camera and the second camera respectively, and wherein the illumination light source and the first camera are so relatively arranged that a divergence angle $\theta_1$ of not more than 5 mrad illuminating light emitted from the illuminating light source and a single-pixel viewing angle $\theta_2$ of the first camera are smaller than an angle $\alpha$ formed between an optical axis of the illuminating light and an optical axis of the reflected light from the illuminated object.

5. An object recognizing device as defined in claim 4, characterized in that the first camera is sensitive to a wavelength band of visible light or near infrared radiation and the second camera is sensitive to a wavelength band of infrared radiation.

6. An object recognizing device as defined in claim 5, characterized in that the second camera is sensitive to a wavelength band of infrared radiation of near 10 microns.

7. An object recognizing device for recognizing an object comprising, a light source for transmitting light toward the object, and a light sensor for receiving reflected light from the object, said light source having a divergence angle, $\theta_1$ of not more than 5 mrad and said light source and said light sensor being relatively positioned so that said divergence angle $\theta_1$ of the light transmitted from the light source is smaller than an angle $\alpha$ formed between an optical axis of the transmitted light and an optical axis of the reflected light entering into the light sensor.

8. An object recognizing device as defined in claim 7, wherein the light source and the light sensor are disposed at a relative vertical distance of not less than 20 cm therebetween.

9. An object recognizing device according to claim 7, wherein said light sensor has a divergence angle $\theta_2$ of reflected light entering into the light sensor, and said divergence angle $\theta_2$ of said light sensor is smaller than an angle $\alpha$ formed between an optical axis of the transmitted light and an optical axis of the reflected light.

10. An object recognizing device according to claim 7, wherein said light source is an illuminating light source, said light sensor includes a first camera having a single-pixel viewing angle for taking an image of an area illuminated by the illumination light source, a second camera is provided for taking an image in the same direction as the first camera but in a different sensitive range of wavelengths than said first camera, and an image synthesizing means for synthesizing the two images taken by said first and second cameras, respectively, and wherein the illumination light source and the first camera are relatively positioned so that a divergence angle $\theta_1$ of the illuminating light emitted from the illuminating light source and the single-pixel viewing angle $\theta_2$ of said first camera is smaller than an angle $\alpha$ formed between an optical axis of the illuminating light and an optical axis of the reflected light from the illuminated object.

11. An object recognizing device as defined in claim 10, characterized in that said first camera is sensitive to a wavelength band of visible light and the second camera is sensitive to a wavelength band of infrared radiation.

12. An object recognizing device as defined in claim 11, characterized in that the second camera is sensitive to a wavelength band of infrared radiation of near 10 microns.

13. An object recognizing device for a vehicle for recognizing an object in front of the vehicle when the air includes significant aerosol particles, comprising, a light source mounted on the vehicle for transmitting light forwardly toward the object, a light sensor mounted on the vehicle and pointed forwardly for receiving reflected light from the object, said light source emitting a light beam having a divergence angle $\theta_1$ of not more than 5 mrad, and said light source and said light sensor being relatively positioned on the vehicle at a spacing so that said divergence angle of the light transmitted from the light source is smaller than the angle $\alpha$ formed between an optical axis of the transmitted light and an optical axis of the reflected light entering into the light sensor for minimizing the volume of air and the aerosol particles illuminated by the transmitted light and reflected light and thereby minimizing light scattering for enhancing the reception by the light sensor of reflected light from the object.

14. An object recognizing device as defined in claim 13, wherein the light source and the light sensor are disposed at a relative vertical distance of not less than 20 cm therebetween.

15. An object recognizing device according to claim 13, wherein said light sensor has a divergence angle of reflected light entering into the light sensor, and said divergence angle of said light sensor is smaller than an angle formed between an optical axis of the transmitted light and an optical axis of the reflected light.

16. An object recognizing device according to claim 13, wherein said light source is an illuminating light source, said light sensor includes a first camera having a single-pixel viewing angle for taking an image of an area illuminated by the illumination light source, a second camera is provided for taking an image in the same direction as the first camera but in a different sensitive range of wavelengths than said first camera, and an image synthesizing means for synthesizing the two images taken by said first and second cameras, respectively.

17. An object recognizing device as defined in claim 16, characterized in that said first camera is sensitive to a wavelength band of visible light and the second camera is sensitive to a wavelength band of infrared radiation.

* * * * *